UNITED STATES PATENT OFFICE.

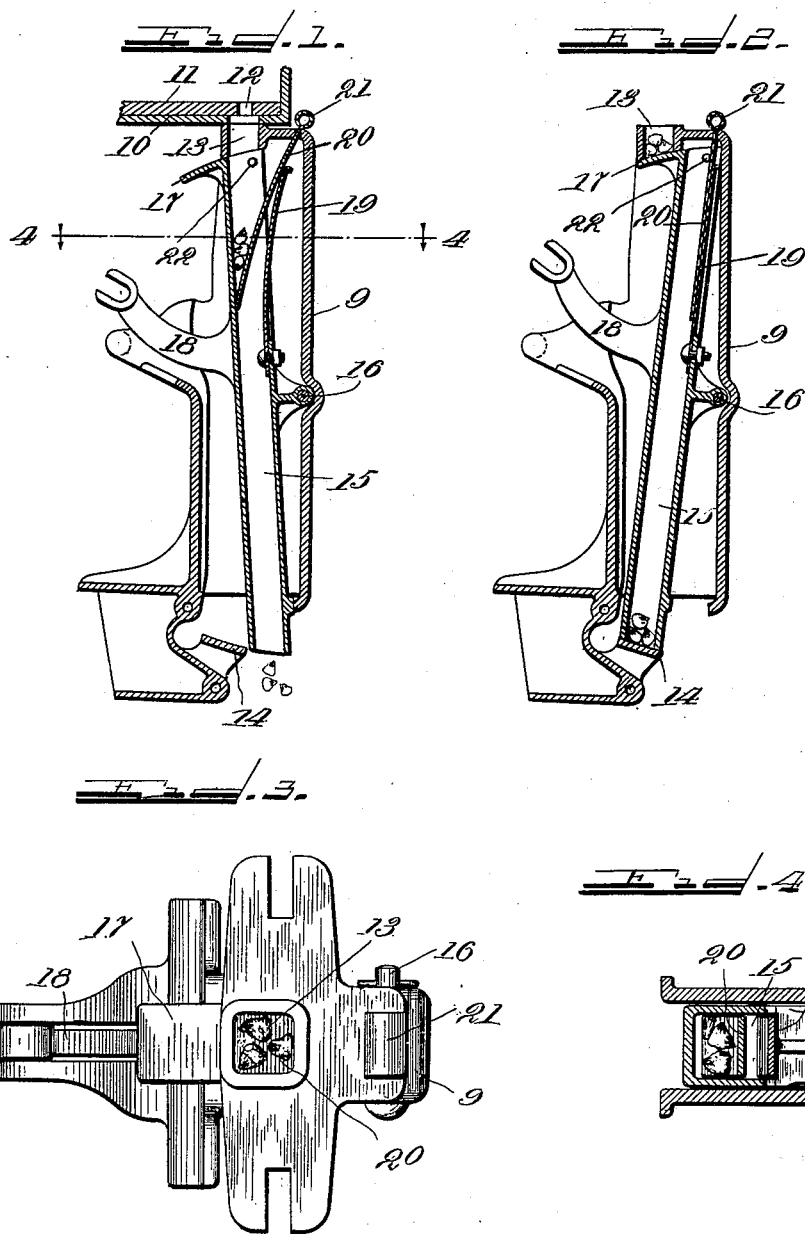

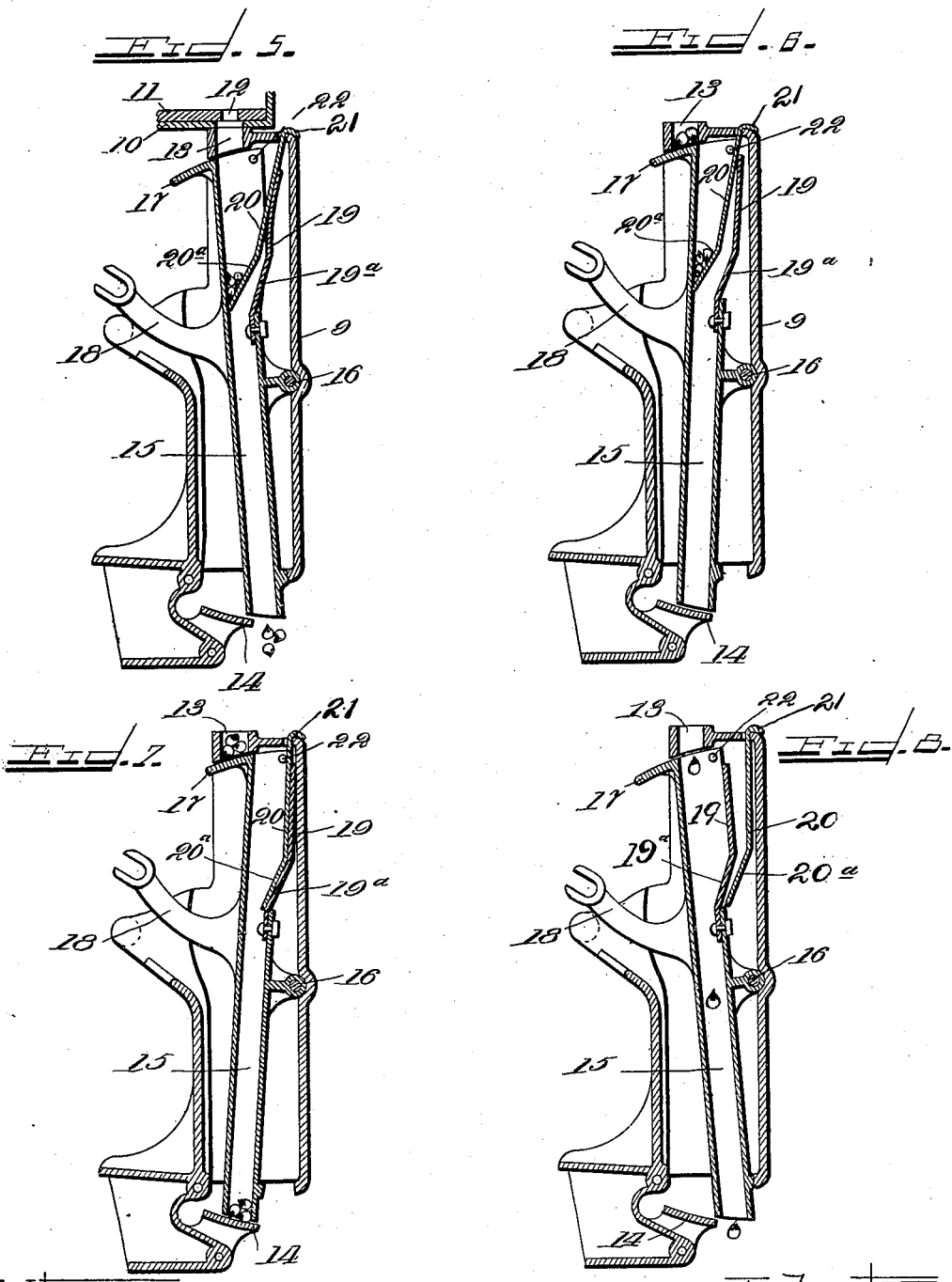

JOHN C. TUNNICLIFF, OF MOLINE, ILLINOIS, ASSIGNOR TO THE D. M. SECHLER CARRIAGE COMPANY, OF SAME PLACE.

RUNNER-VALVE FOR CORN-PLANTERS.

SPECIFICATION forming part of Letters Patent No. 665,708, dated January 8, 1901.

Application filed November 9, 1900. Serial No. 35,996. (No model.)

*To all whom it may concern:*

Be it known that I, JOHN C. TUNNICLIFF, a citizen of the United States, residing at Moline, in the county of Rock Island and State of Illinois, have invented certain new and useful Improvements in Runner-Valves for Corn-Planters, of which the following is a specification, reference being had to the accompanying drawings.

My invention relates to corn-planters; and its object is to provide a new and improved form of runner-valves for said corn-planters which may be used either when the corn-planter is to be employed in planting the corn in hills or in drilling the corn, and which will insure a proper and accurate delivery of the desired number of grains to the ground, and which will also prevent the accidental passing of any grains of corn singly from the hopper through the runner-shank and into the ground when the corn-planter is used in planting corn in hills or "check-rowing" it, as it is commonly known.

In the accompanying drawings, Figure 1 is a vertical longitudinal section of the runner-shank and accompanying devices, showing the swinging tube with its upper end swung forward and its lower end swung backward delivering the corn. Fig. 2 is a vertical longitudinal section showing the tube swung into its other position. Fig. 3 is a top or plan view of the runner-shank. Fig. 4 is a cross-section on line 4 4 of Fig. 1. Figs. 5, 6, and 7 are vertical longitudinal sections showing modified forms of my device with the parts in several positions, and Fig. 8 is a vertical longitudinal section showing the parts in position to be used in drilling corn.

Referring to the accompanying drawings, 9 indicates a runner-shank which is fastened below the seedbox 10 in the usual manner. The seedbox 10 is provided with seed-plates 11, having seed-cups 12. As the seedbox 10 and the seed-plates 11, with their seed-cups 12, may be of any approved form and construction and separately form no part of my present invention, I have simply indicated said seed box and plate in Fig. 1. The seed-plate when used with the hilling devices hereinafter described may be either of the type in which the seed-cups are of a size sufficient to contain in one charge the desired number of grains of corn, depositing them all at once to be delivered by the runner-valves, or it may be of the type in which the seed-cups are of a size sufficient to receive only one grain of corn and deliver the grains one at a time until the desired charge is accumulated. The runner-shank 9 is hollow, as is indicated in the several figures, and is provided at its top with a cup 13, opening at its top below a suitable opening in the seedbox and at its bottom into the runner-shank and adapted to receive and hold a charge of corn of the desired number of grains as the corn is delivered to it by the rotation of the seed-plate 11. The runner-shank 9 is open also at its lower end and is provided near its lower end with a shelf 14.

15 indicates a tube, preferably rectangular in cross-section, which is pivoted near its middle point inside of the runner-shank 9 by means of a pin 16, so as to oscillate in said runner-shank. The upper end of the tube 15 is provided with a shelf 17, which as the upper end of the tube 15 is swung backward passes immediately below the cup 13, so as to close the opening of the same into the tube 15, as is shown in Figs. 2 and 7, whereby the charge of corn of the requisite number of grains is retained in the cup 13 when delivered by the seed-plate 11, as hereinafter described. The front wall of the runner-shank 9 is cut away above its middle portion, so as to permit of the free oscillation of the tube 15 therein. The seed-tube 15 is provided with an arm 18, which projects forward through the cut-away portion of the front wall of the runner-shank 9 and is adapted to be engaged by or connected with any suitable check-rower mechanism in order to oscillate the tube 15 at proper intervals. As this check-rower mechanism and its connection with the arm 18 may be of any well-known and approved form and construction, operating in the well-known way, it is not necessary to show or describe the same.

The upper portion of the rear wall of the tube 15 is cut away, and its place is filled by a spring-plate 19, which is bolted or otherwise suitably secured at its lower end to the rear wall of the tube 15. The spring-plate 19 extends upward nearly to the top of the tube 15 and is of such width as to extend across the seed-tube 15 between the side walls thereof.

20 indicates a plate, preferably of spring metal, which is provided at its upper end with a head 21. The plate 20 is inserted through a suitable slot in the top of the runner-shank 9 when the swinging tube 15 is swung back into the position shown in Fig. 2 and is of such width as to extend across the seed-tube 15 from side to side. The plate 20 is supported in position by means of the head 21, which prevents its falling down into the tube 15, and the plate is so supported in the runner-shank as to be capable of swinging forward and backward therein. I prefer to do this by making the slot of sufficient width to allow the plate 20 play enough to swing forward to close the tube and backward again into the first position, as is hereinafter described; but this, it is obvious, may be accomplished in other ways. For instance, the plate 20 may be formed of spring metal, so as to be capable of being pushed forward to close the swinging tube 15, as hereinafter described, and to spring back again into the first position when left free. The top of the plate 19 should extend as near to the top of the swinging tube 15 as is consistent with allowing sufficient play of the parts in order that, bearing as near as may be to the point from which the plate 20 is swung, it will operate to swing the plate 20 forward very quickly and close the swinging tube when operated as hereinafter described.

In the modification shown in Figs. 5, 6, and 7 I have shown a somewhat different form of the plates 19 and 20, and this is the form which I prefer to use in a corn-planter. In the form shown in these figures the plate 20 is bent at an obtuse angle near its lower end, so as to form a portion 20ª, which bends somewhat forward across the tube, giving the plate 20 something of a spoon shape. In this case the plate 19 is also bent at a similar angle, so as to form a forward-projecting portion 19ª, in order to allow the plate 20 to swing back into the position shown in Fig. 7 to open a passage-way through the tube 15. This form of construction enables the swinging tube 15 to be more rapidly and certainly closed when operated as hereinafter described to insure against any possible dribbling of corn through the tube and consequent irregularity of the dropping of the corn. In either form I prefer to provide the swinging tube 15 with a small lug or boss 22 on its inner surface and upon one side thereof, which will bear upon the plate 20 when the swinging tube 15 is oscillated backward, as hereinafter described, and insure the complete throwing backward of the plate 20.

When it is desired to use the corn-planter as a check-rower, the plate 20 is inserted in place, as above described and as shown in all the figures except Fig. 8. The swinging tube being in the position shown in Figs. 2 and 7, the grains of corn are deposited in the cup 13 by the operation of the seed-plate 11, either one at a time until the requisite number are accumulated therein or the entire charge being deposited at once, as above described, and are held in the cup 13 by the shelf 17, as is shown in Figs. 2 and 7. When the requisite number of grains of corn is deposited in the cup 13, the tube 15 is swung by means of any well-known check-rower devices operating in the usual manner into the position shown in Figs. 1 and 5. As soon as this movement is begun the upper end of the plate 19 bears upon the plate 20, and the plate 20 is thus thrown forward, so that its lower end abuts against the front wall of the tube 15, as is shown in Figs. 1 and 5, the spring-plate 19 yielding slightly backward, as is shown in Figs. 1, 5, and 6, as the forward oscillation of the upper end of the tube 15 continues.

By making the plate 19 of spring metal, so that it will yield backward, as above described, it is obvious that its upper end may come much nearer the top of the tube 15 than would be the case if it were rigid, so that the plate 20 will be more instantly swung forward to close the tube 15 and there will be less danger of breaking or bending the plate 20, which, as I have said, is preferably formed of spring metal, though this is not essential to my invention, as it is obvious that a rigid plate would be thrown forward by the movement of the tube just described, so as to close the discharge through the tube. The corn which has previously been gathered into the cup 13 is by this movement dropped into the tube 15, where it is retained by the plate 20, as is shown in Figs. 1, 5, and 6, thus preventing the accidental discharge of any single grain of corn through the tube before they have been deposited in the desired number upon the bottom shelf 14, as hereinafter described.

As soon as the check-rower mechanism is released in the well-known way by the usual and well-known springs or other equivalent devices in said check-rower mechanism the parts are instantly returned to their former position, oscillating the tube 15 back into the position shown in Figs. 2 and 7. As the upper end of the tube 15 oscillates backward the lug or boss 22 contacts the plate 20 and forces it with certainty back into the position shown in Figs. 2 and 7. In any ordinary work the plate 20 will come into this position by the operation of gravity; but in going down a hill sufficiently steep the plate would tend to hang forward, and I therefore, as I said, provide the tube 15 with a lug or boss 22, which will insure the plate 20 being thrown completely back, so as to open the discharge through the tube 15.

As soon as the parts are in the position shown in Figs. 2 and 7 the grains of corn which have theretofore been held in the tube by the plate 20 drop down and are arrested by the shelf 14. In the meanwhile another charge of corn is deposited in the cup 13, and at the next operation of the check-rower devices the tube 15 is again oscillated and the grains of corn lying upon the shelf 14 are swept downward and backward and deposited close together in the ground. The swinging tube 15 is so constructed and is of such length and moves such a distance that the forward motion of the planter is counteracted in the delivery of grains of corn by the backward sweep of the lower end of the tube 15, so that the grains of corn are dropped to the ground in a state of rest as compared with the forward motion of the planter. It will be seen that by the devices operating as above set forth the discharge of the proper number of grains of corn close together in the ground is insured without any liability of single grains falling through the tube and not being arrested by the shelf 14, so as to be swept therefrom in proper number.

The quickness of operation of the devices, especially as shown in the modified form, is illustrated in Fig. 6, in which the operation, starting from the position shown in Fig. 7, has just begun, showing that the discharge through the tube 15 is closed by the operation of the plate 20 before the passage from the cup 13 into the tube 15 is open. In the reverse motion of course the same thing will be true, and the tube will not be opened by the backward movement of the plate 20 until the parts have passed in their backward operation into the position shown in Fig. 6. This construction absolutely insures against dribbling of the corn—that is to say, the accidental discharge of single grains at a time through the tube 15 and the discharge of an improper number of grains from the tube into the ground.

When it is desired to use the planter as a drill, the plate 20 is pulled out and the parts locked in any suitable manner in the position shown in Fig. 8, so as to leave the discharge open from the seed-cup through the tube 15 to the ground. In this case the plate 20 may be reinserted in the slot provided for that purpose and allowed to remain in place, as is shown in Fig. 8, without in any way affecting the operation of the parts.

That which I claim as my invention, and desire to secure by Letters Patent, is—

1. The combination with a runner-shank, and an oscillatory seed-tube mounted in said runner-shank, of a plate mounted in said runner-shank, extending downward into said seed-tube, and adapted, when the upper end of said seed-tube is swung forward, to automatically close the passage through said seed-tube, substantially as described.

2. The combination with a runner-shank, and an oscillatory seed-tube mounted in said runner-shank, of an oscillatory plate mounted in said runner-shank, extending downward into said seed-tube, and adapted, when the upper end of said seed-tube is swung forward, to automatically close the passage through said seed-tube, and a lug at the upper end of said seed-tube, adapted to bear against said oscillatory plate when the upper end of said seed-tube is swung forward, and to throw said plate backward to open the discharge through the tube, substantially as described.

3. The combination with a runner-shank, and an oscillatory seed-tube mounted in said runner-shank, of an oscillatory plate mounted in said runner-shank, extending downward into said seed-tube, and adapted, when the upper end of said seed-tube is swung forward, to close the passage through said seed-tube by the bearing of said seed-tube against said plate, substantially as described.

4. The combination of a runner-shank having a shelf at its lower end, and an oscillatory seed-tube mounted in said runner-shank, and adapted at its lower end to swing forward over said shelf, of a plate mounted in said runner-shank, extending downward into said seed-tube, and adapted, when the upper end of said seed-tube is swung forward, to close the passage through said seed-tube by the bearing of said seed-tube against said plate, substantially as described.

5. The combination with a runner-shank having a shelf at its lower end, and an oscillatory seed-tube mounted in said runner-shank, provided with a shelf at its upper end adapted to close the passage into said runner-shank from above when the upper end of said seed-tube is swung backward, and adapted at its lower end to swing forward over said shelf in said runner-shank, of a plate mounted in said runner-shank, extending downward into said seed-tube, and adapted, when the upper end of said seed-tube is swung forward, to close the passage through said seed-tube by the bearing of said seed-tube against said plate, substantially as described.

6. The combination with a runner-shank having a shelf near its lower end, an oscillatory seed-tube mounted in said runner-shank, provided with a shelf at its upper end and adapted at its lower end to swing forward over said shelf and said runner-shank, of a plate mounted in said shank, extending into said seed-tube and adapted, when the upper end of said seed-tube is swung, to close the passage through said seed-tube, and a spring-plate mounted in the upper end of said seed-tube and adapted to yieldingly press against said plate when the upper end of the seed-tube is swung forward, substantially as described.

7. The combination with a runner-shank having a cup at its upper end adapted to receive a charge of corn and having a shelf at its lower end, an oscillatory seed-tube mounted in said runner-shank, having a shelf at its upper end adapted to close the opening into said cup from below when the upper end of said seed-tube is swung backward and adapted to swing forward at its lower end over said shelf in said runner-shank, of a plate mounted in said shank, extending downward into said tube and adapted, when the upper end of said tube is swung forward, to close the passage through said tube, substantially as described.

8. The combination with a runner-shank having a shelf near its lower end, an oscillatory seed-tube mounted in said runner-shank, provided with a shelf at its upper end and adapted at its lower end to swing forward over said shelf on said runner-shank, of a removable plate mounted in said shank, extending into said seed-tube and adapted, when the upper end of said seed-tube is swung forward, to close the passage through said seed-tube, and a spring-plate mounted in the upper end of said seed-tube and adapted to yieldingly press against said removable plate when the upper end of the seed-tube is swung forward, substantially as described.

9. The combination with a runner-shank having a cup at its upper end adapted to receive a charge of corn and having a shelf at its lower end, an oscillatory seed-tube mounted in said runner-shank, having a shelf at its upper end adapted to close the opening into said cup from below when the upper end of said seed-tube is swung backward and adapted to swing forward at its lower end over said shelf in said runner-shank, of a removable plate mounted in said shank, extending downward into said tube and adapted, when the upper end of said tube is swung forward, to close the passage through said tube, substantially as described.

10. The combination with a runner-shank, and an oscillatory seed-tube mounted in said runner-shank, of an oscillatory plate mounted in said runner-shank, extending downward into said seed-tube and having its lower end bent forward, and adapted, when the upper end of said seed-tube is swung forward, to automatically close the passage through said seed-tube, substantially as described.

11. The combination with a runner-shank, and an oscillatory seed-tube mounted in said runner-shank, of an oscillatory plate mounted in said runner-shank, extending downward into said seed-tube, having its lower end bent forward and adapted, when the upper end of said seed-tube is swung forward, to automatically close the passage through said seed-tube, and a lug at the upper end of said oscillatory seed-tube adapted to bear against said oscillatory plate and throw the same backward, so as to open said seed-tube when the upper end of said seed-tube is swung backward, substantially as described.

JOHN C. TUNNICLIFF.

Witnesses:
ELMER E. MORGAN,
W. J. DAVIS.